United States Patent [19]
Notoya

[11] 4,117,998
[45] Oct. 3, 1978

[54] RETAINING DEVICE FOR CORDS

[75] Inventor: Yoshiaki Notoya, Zushi, Japan

[73] Assignee: Nifco, Inc., Tokyo, Japan

[21] Appl. No.: 861,158

[22] Filed: Dec. 16, 1977

[30] Foreign Application Priority Data

Jan. 26, 1977 [JP] Japan .............................. 52/7273[U]

[51] Int. Cl.² .......................... F16L 3/22; F16L 5/00
[52] U.S. Cl. .......................................... 248/56; 16/2;
174/153 G; 248/68 R; 339/105; 403/197;
24/115 R; 24/255 SL
[58] Field of Search ..................... 16/2, DIG. 35, 108;
174/65 G, 152 G, 153 G, 155, 156, 83; 339/103
B, 105, 103 C; 248/68 R, 68 CB, 67.5, 56;
403/41, 195, 197; 24/73 AP, 115 R, 255 S

[56] References Cited
U.S. PATENT DOCUMENTS

| 2,563,604 | 8/1951 | Hultgren ............................. 16/2 UX |
| 2,895,003 | 7/1959 | Rapata ..................................... 16/2 |
| 3,424,856 | 1/1969 | Coldren .................................. 16/2 X |
| 3,958,300 | 5/1976 | Tanaka ..................................... 16/2 |
| 4,029,896 | 6/1977 | Skinner ............................ 339/105 X |

Primary Examiner—Werner H. Schroeder
Assistant Examiner—Moshe I. Cohen
Attorney, Agent, or Firm—Jack R. Halvorsen; Robert W. Beart

[57] ABSTRACT

Disclosed is a retaining device for cords, which comprises a pair of retainer blocks formed integrally through the medium of a thin-walled hinge piece, one of said pair of retainer blocks being provided with a plurality of paths for interchangeably admitting cords of differing cross sections and the remaining retainer block being provided with push pieces adapted to push down the cord laid through a selected one of said paths, whereby cords of differing cross section can be retained in proper posture by being received in a path of conforming contour and the pair of retainer pieces being folded over each other across said thin-walled hinge piece.

3 Claims, 5 Drawing Figures

RETAINING DEVICE FOR CORDS

BACKGROUND OF THE INVENTION

This invention relates to improvements in and concerning a retaining device for cords. More particularly, this invention relates to a retaining device for cords, which device can be applied to cords of varying cross section such as twin-core cords and coaxial cords.

Grommets and retaining devices for cords are generally used on electric appliances for the purposes of preventing cords from being injured on their surfaces by sharp corners of holes perforated through panels where the cords connected to the appliance interiors are led out for external connection or for the purpose of preventing such cords from being ripped off the points of contact within the appliances by inadvertent pulls given to the portions of the cords outside the appliance housings.

The cord retaining devices of this type which are prevalent in the market are represented by that which is disclosed in Japanese Utility Model Laid-Open Publication No. 131595/1975 and that which is disclosed in U.S. Pat. No. 3,958,300 which has issued to the applicant of this patent application. For the purpose of preventing cords from being ripped off the points of contact within the appliances by dint of pulls externally given to the cords, these conventional cord retaining devices have been expected to fulfil the requirement that the paths formed therein for admitting cords should possess contours conforming to the cross sections of the cords to be laid therein.

In the former cord retaining device, a push piece is disposed in such a way that it will protrude into an otherwise smoothly continued path to be formed for admitting a cord therein by the two halved blocks of the device being folded over each other across a hinge piece and this protruding push piece will serve to pinch the cord in a zigzagging form so that any pull externally exerted on the cord and transmitted therethrough will be intercepted by the push piece. If this device happens to be intended for use with a twin-core cord, it is incapable of retaining a coaxial cord or any other cord having a circular cross section. In the latter cord retaining device, two halved blocks thereof are provided with matching grooves which are so shaped as to give a path for admitting a cable when said blocks are folded over each other. Again the path thus formed has a fixed contour which only fits a cord possessing a conforming cross section. Thus, this device is usable only with either a twin-core cord or a circular cord but cannot be used with both types of cord.

Thus, no conventional cord retaining device is capable of retaining various cords of differing cross sections such as twin-core cords and coaxial cords. Thus, the conventional devices have lacked interchangeability.

An object of this invention is to provide a cord retaining device which possesses paths suitable for admitting two kinds of cords having different cross sections from each other and enjoys ready interchangeability.

Another object of this invention is to provide a cord retaining device which can be integrally shaped easily and inexpensively by injection molding of a plastic material.

SUMMARY OF THE INVENTION

To accomplish the objects described above according to the present invention, there is provided a retainer device for cords which comprises a pair of retainer blocks connected to each other through the medium of a thin-walled hinge portion, one of the pair of retainer blocks being provided on the innerface side thereof with a plurality of paths for admitting cords of differing cross sections and the remaining retainer block being provided with push pieces adapted to protrude into said paths and serve to push down the cords to be laid in the paths when the two retainer blocks are folded over each other.

A cord having a circular cross section such as a coaxial cord is laid through the one of said paths which has a conforming contour. When the remaining retainer block is folded over the first retainer block now containing the cord, the cord in the path is pushed down by the protruding push piece and forced to assume a zigzagging shape. A twin-core cord of a depressed cross section can be safely retained by the device of this invention when the cord is laid in another path of a limited width and a specific construction such that the cord, when extended through the path from one end to the other thereof, is bent arcuately and twisted within the path. Thus, the retaining device of this invention is internally provided with paths, one for admitting a circular cord and another for admitting a twin-core cord, and is therefore capable of retaining either of the cords tightly in a zigzagging form or twisted form and thereby preventing the cord from being injured on its surface by the sharp corner of a hole perforated in a panel where the cord is led out of the electric appliance housing or preventing the cord from being ripped off its point of contact within an appliance by an externally exerted pull. This device enjoys both adaptability and interchangeability.

The other objects and characteristic features of the present invention will become apparent from the description to be given in further detail with reference to the accompanying drawing.

DETAILED DESCRIPTION OF THE INVENTION

Figure 1:
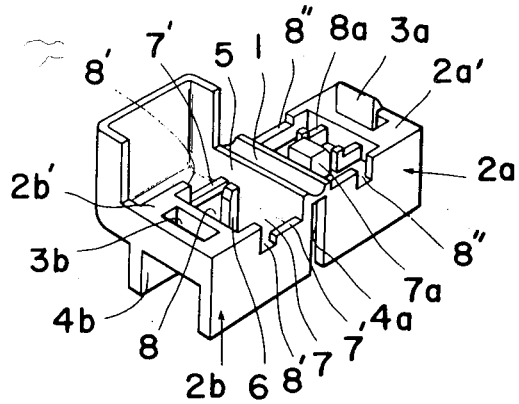
FIG. 1 is a perspective view of one preferred embodiment of the cord retaining device according to the present invention.
Figure 2A:
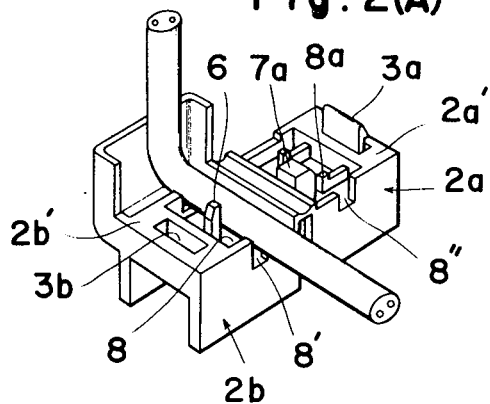
FIG. 2(A) is a perspective view of the cord retaining device of FIG. 1, illustrating the device as holding a cable in one of the paths formed therein.
Figure 2B:
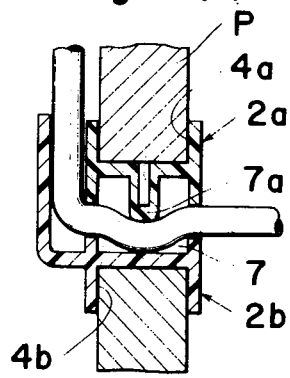
FIG. 2(B) is a longitudinal section of the cord retaining device of FIG. 2(A), illustrating the device as holding a cord in said path.
Figure 3A:
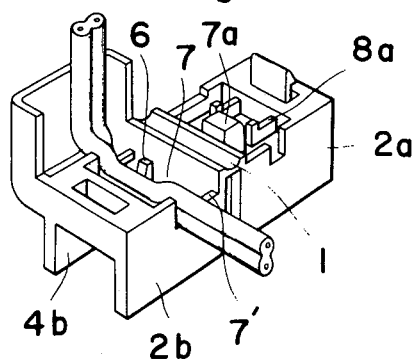
FIG. 3(A) is a perspective view of the cord retaining device of FIG. 1, illustrating the device as holding a cord in the other path formed therein.
Figure 3B:
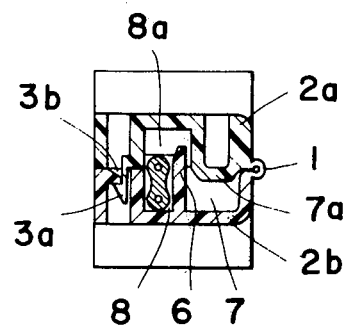
FIG. 3(B) is a lateral section of the cord retaining device of FIG. 3(A), illustrating the cord as holding a cord in said path.

With reference to the drawing, one pair of retainer blocks 2a, 2b are integrally shaped of a plastic material and connected to each other through the medium of a thin-walled hinge portion 1. The two retainer blocks 2a, 2b are brought into face-to-face contact with each other when they are folded along the thin-walled hinge portion 1 toward each other. From the one face 2a' of the mutually flush faces 2a', 2b' of the two retainer blocks which come into confrontation when the blocks are folded over each other, a check claw 3a projects near the free end thereof. Near the free end of the other face 2b', there is formed a hole 3b which admits said check claw 3a as the two retainer blocks are brought close toward each other and which finally permits said check claw 3a to snap into hooking engagement with the inner side of the edge of said hole when the blocks are joined tightly. This engagement will keep the two retainer blocks from freely separating from each other. The two retainer blocks are provided on the sides opposite said faces 2a', 2b' with grooves 4a, 4b so that when the retainer blocks are in a completely folded form, the device may be attached to a given panel P by having said grooves 4a, 4b slide along the opposed edges of a slit cut in the panel from one edge of the panel to a required point. In the flush face 2b' of the retainer block 2b, there is formed a dent 5. From the center of the bottom of said dent 5, stands a rib 6 so as to divide the inner space of said dent into two paths 7, 8 extending in the direction of the length of the hinge portion 1. In the preferred embodiment illustrated here, the path 7 has a width large enough for a coaxial cord or a thick twin-core cord to be laid therein in a flat state (FIG. 2(A)) and the other path 8 has a small width barely large enough for a thin twin-core cord to be laid therein in a state lying on its side (FIG. 3(A)). For this reason, the other retainer block 2a is provided with a push piece 7a and a push piece 8a, the push piece 7a serving to push down a cord laid through the path 7 and the push piece 8a to push down a cord laid through the path 8 respectively when the retainer block 2a is folded over the retainer block 2b. In the end walls of the retainer block 2b where the opposite ends of the path 7 are positioned, notches 7', 7' are formed to a depth slightly lower than the level of the flush faces. Owing to these notches, a cord laid through the path 7 is downwardly bent in the shape of the letter U between the opposite ends of the path when the two retainer blocks are folded over each other and joined tightly. This downward bend serves to keep the cord so tightly in position that it will no longer be moved by a pull given thereto in the direction of its length. In contrast, the notches 8', 8' formed in the opposite ends in order for a cord to be laid through the path 8 in a state lying on its side are shifted sidewise from the path. For example, they are formed in the end walls of the retainer block 2b at positions such that they fall on both sides of the rib 6. When a cord is inserted sidewise into the notches 8', 8' and is laid through the path 8, the cord is found to be bent in the shape of the letter U as observed from above and is twisted only in this bent portion. When the two retainer blocks are folded over each other and joined fast, the push piece 8a presses the cord against the bottom of the path 8 and one side wall and immobilizes it in the longitudinal direction. The notches 7' and 8' may be formed continuously in a stepped form as illustrated where necessary. If notches 8'', 8'' are additionally formed in the end walls of the retainer block 2a at positions such that they fall exactly on the notches 8', 8' when the retainer blocks are joined face to face, then a cord of a greater width can be laid through the path 8. Of course two cords can be laid one each in the two paths 7 and 8 so that they may be immobilized at the same time by this device. The rib 6 functions as a guide for passing a cord and, at the same time, serves to press the cord against the side wall of the dent when the two retainer blocks are folded over each other. It should best protrude slightly from the face 2b'.

According to the present invention, a cord of a circular cross section such as a coaxial cord and a twin-core cord can be respectively retained by the paths 7 and 8 as illustrated. Twin-core cords of varying thickness can be selectively retained by one and the same device of the present invention by suitably selecting the direction of their insection into the paths, depending on the cord widths. Further, two cords can be retained at the same time by this device. The device, when given three or more paths, can be used for retaining more cords all at once.

Because of the great adaptability and interchangeability offered by this invention, the conventional inventory system which required the storing of numerous kinds of cord retaining devices containing different paths so as to permit selection of proper devices suiting the particular cords given to be retained is made unnecessary. When the retaining device itself is so constructed that one path 7 is used for passing a cord of a great thickness or a depressed cord of a large thickness in a flat state and the other path 8 is used for passing a depressed cord in a state lying on its side, the device can be obtained in a size not too large. Thus, the cord retaining device of this invention enjoys outstanding adaptability and interchangeability in the sense described above.

What is claimed is:

1. A retaining device for cords, which device comprises a pair of retainer blocks formed integrally and connected to each other through the medium of a thin-walled hinge portion, one of said two retainer blocks being provided in the face continuing into said hinge portion with a plurality of paths for admitting cords of differing cross sections and the other retainer block being provided in the face continuing into said hinge portion with push pieces adapted to protrude into said paths and push down the cords to be laid through said paths. and wherein one of the two paths formed in one of the two retainer blocks is obstructed by one of said push pieces provided on the other retainer block and the other path is obstructed by a rib protruding in the direction of the width of the path, whereby a cord laid through either of the paths is forced to assume an arcuately bent shape.

2. The cord retaining device according to claim 1, wherein a check claw is protrudingly formed near the free end of one retainer block and a hole for receiving said check claw is formed near the free end of the other retainer block, whereby said check claw snaps into hooked engagement with the edge of said hole when the two retainer blocks are folded over each other.

3. The cord retaining device according to claim 1, wherein grooves are formed one each in those edges of the two retainer blocks which fall on the opposite sides from each other when the retainer blocks are folded over each other and, by virtue of the opposite grooves, the device can be attached to the panel of a given appliance by having said grooves slide along the opposed edges of a slit cut into the panel.

* * * * *